(12) United States Patent
Kawamoto et al.

(10) Patent No.: US 12,187,009 B2
(45) Date of Patent: Jan. 7, 2025

(54) SURFACE-TREATED STEEL SHEET

(71) Applicant: NIPPON STEEL CORPORATION, Tokyo (JP)

(72) Inventors: Kosuke Kawamoto, Tokyo (JP); Yasuto Goto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/035,988

(22) PCT Filed: Nov. 29, 2021

(86) PCT No.: PCT/JP2021/043527
§ 371 (c)(1),
(2) Date: May 9, 2023

(87) PCT Pub. No.: WO2022/118769
PCT Pub. Date: Jun. 9, 2022

(65) Prior Publication Data
US 2023/0415453 A1 Dec. 28, 2023

(30) Foreign Application Priority Data
Dec. 3, 2020 (JP) ................................ 2020-200745

(51) Int. Cl.
*B32B 15/01* (2006.01)
*C21D 1/74* (2006.01)
(Continued)

(52) U.S. Cl.
CPC .............. *B32B 15/015* (2013.01); *C21D 1/74* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS 11,352,682 B2 * 6/2022 Takahashi ........... H01M 50/124
2013/0209864 A1 8/2013 Kuniya et al.
(Continued)

FOREIGN PATENT DOCUMENTS

| CN | 103119747 A | 5/2013 |
| WO | 2012/147843 A1 | 11/2012 |

(Continued)

*Primary Examiner* — Daniel J. Schleis
(74) *Attorney, Agent, or Firm* — Renner, Otto, Boisselle & Sklar, LLP

(57) ABSTRACT

The surface-treated steel sheet includes an alloy layer containing Ni and Co. In a case where, in a cross section obtained by cutting the alloy layer in the thickness direction, a range having a width of 2000 nm and extending from the surface of the alloy layer to a depth of 100 nm is partitioned into regions each having a width of 100 nm and a depth of 100 nm, within the range the alloy layer includes a plurality of high Co concentration regions in each of which the ratio of a Co concentration to a sum of the Co concentration and a Ni concentration within the partitioned region is 0.8 or more, and a plurality of alloyed regions in each of which a ratio of the Co concentration to a sum of the Co concentration and the Ni concentration within the partitioned region is less than 0.8.

6 Claims, 3 Drawing Sheets

(51) Int. Cl.
  *C21D 6/00* (2006.01)
  *C21D 8/02* (2006.01)
  *C21D 9/46* (2006.01)
  *C22C 38/00* (2006.01)
  *C22C 38/02* (2006.01)
  *C22C 38/04* (2006.01)
  *C22C 38/06* (2006.01)
  *C23C 18/32* (2006.01)
  *C25D 3/12* (2006.01)

(52) U.S. Cl.
  CPC ......... *C21D 8/0205* (2013.01); *C21D 8/0226* (2013.01); *C21D 8/0247* (2013.01); *C21D 8/0278* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C23C 18/32* (2013.01); *C25D 3/12* (2013.01)

(56) References Cited

U.S. PATENT DOCUMENTS

| | | |
|---|---|---|
| 2014/0050971 A1 | 2/2014 | Tomomori et al. |
| 2014/0147734 A1 | 5/2014 | Horie et al. |
| 2019/0351765 A1* | 11/2019 | Rabusic ............. A01D 41/1278 |
| 2019/0381765 A1 | 12/2019 | Saito et al. |
| 2020/0035960 A1 | 1/2020 | Nakano et al. |
| 2020/0321566 A1 | 10/2020 | Nakano et al. |
| 2021/0025071 A1 | 1/2021 | Saito et al. |
| 2021/0269929 A1 | 9/2021 | Takahashi et al. |
| 2021/0269932 A1 | 9/2021 | Takahashi et al. |

FOREIGN PATENT DOCUMENTS

| | | |
|---|---|---|
| WO | 2013/005774 A1 | 1/2013 |
| WO | 2018/159760 A1 | 9/2018 |
| WO | 2018/181950 A1 | 10/2018 |
| WO | 2019/083044 A1 | 5/2019 |
| WO | 2019/159794 A1 | 8/2019 |
| WO | 2020/009212 A1 | 1/2020 |
| WO | 2020/009213 A1 | 1/2020 |

* cited by examiner

SURFACE-TREATED STEEL SHEET

TECHNICAL FIELD

The present disclosure relates to a surface-treated steel sheet.

BACKGROUND ART

A surface-treated steel sheet having nickel (Ni) plating on its surface is used as a surface-treated steel sheet for battery containers such as primary batteries and secondary batteries. For example, a common alkaline battery is manufactured as follows. First, a positive electrode can is manufactured by deep-drawing and pressing a surface-treated steel sheet into the shape of a battery container. Next, a conductive film, a positive electrode material, a separator, an electrolyte, a negative electrode material and a current collector are enclosed in the positive electrode can.

In this way, an alkaline battery is manufactured. The positive electrode can function as a battery container and also functions as a current collector. The same also applies with respect to other types of batteries. The surface-treated steel sheet functions as a battery container and also functions as a current collector when connected to a negative electrode or a positive electrode.

On the other hand, the current required of a battery differs according to the intended application. A surface-treated steel sheet having an alloy layer on surface containing cobalt (Co) in addition to Ni is used for batteries for which a discharge with a large current (hereunder, also referred to as a "high-rate characteristic") is required. Co is an active metal in comparison to Ni. Therefore, by containing Co in an alloy layer, the contact resistance between the surface-treated steel sheet and a positive electrode material or a negative electrode material decreases. By this means, the function of the surface-treated steel sheet as a current collector can be enhanced. As a result, the high-rate characteristic of the battery is enhanced.

Surface-treated steel sheets for a battery that each include an alloy layer containing Ni and Co on the surface thereof and which are capable of improving the high-rate characteristic of a battery are disclosed, for example, in International Application Publication No. WO2019/159794 (Patent Literature 1), International Application Publication No. WO2012/147843 (Patent Literature 2), International Application Publication No. WO2019/083044 (Patent Literature 3) and International Application Publication No. WO2013/005774 (Patent Literature 4).

International Application Publication No. WO2019/159794 (Patent Literature 1) discloses a surface-treated steel sheet for a battery container that includes a Ni—Co—Fe-based diffusion alloy plating layer on at least one surface of a base steel sheet. The diffusion alloy plating layer is composed of, in order from the base steel sheet side, a Ni—Fe alloy layer and a Ni—Co—Fe alloy layer. In the diffusion alloy plating layer, the Ni coating weight is within a range of 3.0 g/m² or more to less than 8.74 g/m², the Co coating weight is within a range of 0.26 g/m² or more to 1.6 g/m² or less, and the total of the Ni coating weight and the Co coating weight is less than 9.0 g/m². When a surface of the diffusion alloy plating layer is analyzed using X-ray photoelectron spectroscopy, in atom %, Co is 19.5 to 60&, Fe is 0.5 to 30%, and Co+Fe is 20 to 70%. The thickness of the Ni—Fe alloy layer is within a range of 0.3 to 1.3 µm. It is described in Patent Literature 1 that, by this means, a surface-treated steel sheet for a battery container that is excellent in workability while maintaining battery characteristics and liquid leakage resistance is obtained.

International Application Publication No. WO2012/147843 (Patent Literature 2) discloses a surface-treated steel sheet for a battery container in which a nickel-cobalt alloy layer is formed at the outermost surface of a face that is to serve as the inner surface of a battery container. The surface-treated steel sheet for a battery container disclosed in Patent Literature 2 is characterized in that a Co/Ni value obtained by Auger electron spectroscopic analysis on the surface of the nickel-cobalt alloy layer is within a range of 0.1 to 1.5. It is described in Patent Literature 2 that, by this means, a surface-treated steel sheet for a battery container that is excellent in resistance to dissolving in alkaline solution, and that can secure high battery characteristics which are equal to or higher than those of conventional batteries even after the passage of time is obtained.

International Application Publication No. WO2019/083044 (Patent Literature 3) discloses a surface-treated steel sheet that includes a steel sheet and a nickel-cobalt-iron diffusion layer which is formed as an outermost outer layer on the steel sheet. In the surface-treated steel sheet disclosed in Patent Literature 3, when an Ni intensity, a Co intensity and an Fe intensity are measured consecutively in the depth direction from the surface side of the nickel-cobalt-iron diffusion layer by radio frequency glow discharge optical emission spectrometry, and a Ni content ratio, a Co content ratio and an Fe content ratio are determined based on the Ni intensity, the Co intensity and the Fe intensity, at a specific depth position D at which the Ni intensity is 0.5% with respect to a maximum value in the nickel-cobalt-iron diffusion layer, a Co content ratio $In_{Co\_D}$ is 5% by mass or more, and an Fe content ratio $In_{Fe\_D}$ is 11% by mass or more. It is described in Patent Literature 3 that, by this means, a surface-treated steel sheet is obtained that, when used as the battery container of a battery that uses a strong alkaline electrolyte, is excellent in battery characteristics and can suppress a decrease in the battery characteristics even after the passage of time.

International Application Publication No. WO2013/005774 (Patent Literature 4) discloses a surface-treated steel sheet for a battery container including a nickel-cobalt alloy layer formed at an outermost surface on a side which is to serve as the inner surface of a battery container, which is characterized in that when the nickel-cobalt alloy layer is subjected to X-ray diffraction measurement using CuKα as a radiation source, an intensity ratio $I_A/I_B$ that is a ratio of an intensity $I_A$ of a peak present at a diffraction angle 2θ within a range of 41° or more to less than 43° to an intensity $I_B$ of a peak present at a diffraction angle 2θ within a range of 43° or more to 45° or less is within a range of 0.01 to 0.9. It is described in Patent Literature 4 that, by this means, a surface-treated steel sheet for a battery container that can enhance the battery characteristics even when a conductive film is not formed is obtained.

CITATION LIST

Patent Literature

Patent Literature 1: International Application Publication No. WO2019/159794
Patent Literature 2: International Application Publication No. WO2012/147843
Patent Literature 3: International Application Publication No. WO2019/083044

Patent Literature 4: International Application Publication No. WO2013/005774
Patent Literature 5: International Application Publication No. WO2018/181950
Patent Literature 6: International Application Publication No. WO2018/159760
Patent Literature 7: International Application Publication No. WO2020/009212
Patent Literature 8: International Application Publication No. WO2020/009213

SUMMARY OF INVENTION

Technical Problem

In this connection, after being produced, surface-treated steel sheets are stored for a fixed period of time until being used. It is preferable that even when a surface-treated steel sheet has been stored for a fixed period of time, a change in the color of the surface of the surface-treated steel sheet is suppressed.

A surface-treated metal sheet that can prevent a change in the color of the surface thereof even when the surface-treated metal sheet is stored for a long period of time and can also improve the battery characteristics when used as a battery container is disclosed, for example, in International Application Publication No. WO2018/181950 (Patent Literature 5). The surface-treated metal sheet disclosed in Patent Literature 5 includes a metal sheet and a nickel-cobalt binary alloy layer that is formed on the metal sheet, in which, when a portion having a content ratio of oxygen atoms of 5 atom % or more as measured by X-ray photoelectron spectroscopy is taken as an oxide film, the nickel-cobalt binary alloy layer includes an oxide film having a thickness of 0.5 to 30 nm on the surface thereof, and an amount of increase in the thickness of the oxide film is 28 nm or less when a pressure cooker test is performed that includes raising the temperature, holding for 72 hours under a water-vapor atmosphere at a temperature of 105° C. and a relative humidity of 100% RH, and decreasing the temperature.

On the other hand, it is preferable that change in the color of the surface of a surface-treated steel sheet can also be suppressed by a method that is different from the method disclosed in the aforementioned Patent Literature 5.

An objective to the present disclosure is to provide a surface-treated steel sheet which has low contact resistance and which can suppress the occurrence of a change in the color of the surface thereof.

Solution to Problem

A surface-treated steel sheet of the present disclosure includes:
 a steel sheet, and
 an alloy layer containing Ni and Co on a surface of the steel sheet,
 wherein
 in a case where, in a cross section obtained by cutting the alloy layer in a thickness direction, a range having a width of 2000 nm and extending from a surface of the alloy layer to a depth of 100 nm is partitioned into regions each having a width of 100 nm and a depth of 100 nm, within the range the alloy layer includes:
 a plurality of high Co concentration regions in each of which a ratio of a Co concentration to a sum of the Co concentration and a Ni concentration within the partitioned region is 0.8 or more, and
 a plurality of alloyed regions in each of which a ratio of the Co concentration to a sum of the Co concentration and the Ni concentration within the partitioned region is less than 0.8, the plurality of alloyed regions being arranged alternately with the high Co concentration regions.

Advantageous Effect of Invention

The surface-treated steel sheet of the present disclosure has low contact resistance and can suppress the occurrence of a change in the color of the surface thereof.

DESCRIPTION OF EMBODIMENT

Figure 1:
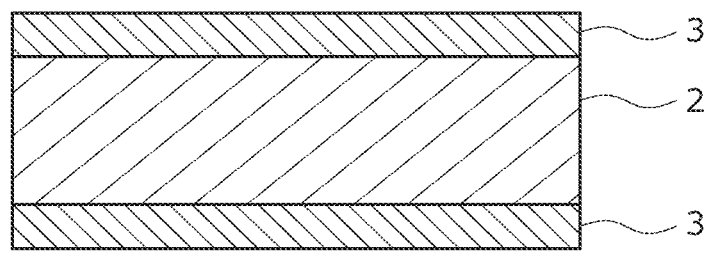
FIG. 1 is a cross-sectional diagram illustrating one example of a surface-treated steel sheet of the present embodiment.

As described in the aforementioned patent literatures, to reduce the contact resistance of a surface-treated steel sheet it is effective to provide an alloy layer containing nickel (Ni) and cobalt (Co) on the surface of the steel sheet.

In previous studies, techniques that control the contact resistance of a surface-treated steel sheet by controlling the Co concentration at the surface of an alloy layer have been proposed. For example, in paragraph [0043] of International Application Publication No. WO2019/159794 (Patent Literature 1), paragraph [0024] of International Application Publication No. WO2018/159760 (Patent Literature 6), paragraph [0075] of International Application Publication No. WO2020/009212 (Patent Literature 7), and paragraph [0063] of International Application Publication No. WO2020/009213 (Patent Literature 8), it is suggested that the contact resistance of a surface-treated steel sheet can be reduced by increasing the Co concentration at the surface of an alloy layer.

In the techniques disclosed in Patent Literature 1 and Patent Literatures 6 to 8, the average concentration of Co within a wide area of a very shallow portion of the surface of an alloy layer is controlled. In paragraphs [0046] and [0083] of International Application Publication No. WO2019/159794 (Patent Literature 1) and paragraphs [0025] and [0058] of International Application Publication No. WO2018/159760 (Patent Literature 6) it is described that the Co concentration at the surface of an alloy layer was measured by XPS (X-ray photoelectron spectroscopy). Further, in paragraphs [0078] and [0122] of International Application Publication No. WO2020/009212 (Patent Literature 7) and paragraphs [0066] and [0111] of International Application Publication No. WO2020/009213 (Patent Literature 8) it is described that the Co concentration at the surface of an alloy layer was measured by AES (Auger electron spectroscopic analysis).

According to the analytical methods XPS and AES that are described in the aforementioned patent literatures, in general, analysis results are obtained for a very shallow range at the surface of an alloy layer. The phrase "very shallow range" refers to a range to a depth of several nm from the surface of the alloy layer. In paragraph [0083] of International Application Publication No. WO2019/159794 (Patent Literature 1) and paragraph [0058] of International Application Publication No. WO2018/159760 (Patent Literature 6) it is described that the surface of an alloy layer is removed by 4 nm sputtering, and thereafter measurement of the surface of the alloy layer is performed. Further, in paragraph [0122] of International Application Publication No. WO2020/009212 (Patent Literature 7) and paragraph [0111] of International Application Publication No. WO2020/009213 (Patent Literature 8) it is described that a surface of an alloy layer is removed by 10 nm sputtering, and thereafter measurement of the surface of the alloy layer is performed. This is because, unless several nm of the surface is removed, noise will be included in the measurement result. Further, an average value within a macro visual field is obtained by the analytical methods XPS and AES. In fact, in paragraph [0122] of International Application Publication No. WO2020/009212 (Patent Literature 7) and paragraph [0111] of International Application Publication No. WO2020/009213 (Patent Literature 8) it is described that the composition of a region having a diameter of 800 μm was analyzed by AES. In other words, according to Patent Literature 7 and Patent Literature 8, an average concentration of Co within a circular region having a diameter of 800 μm is obtained by AES.

As described above, previously, controlling the Co concentration at the surface of an alloy layer has been investigated for the purpose of controlling contact resistance. Further, in previous studies, attention has been focused on the average concentration of Co within a macro visual field at the surface of an alloy layer.

In this connection, as a result of studies conducted by the present inventors it has been found that a surface-treated steel sheet including an alloy layer containing Co changes color under high temperature and high humidity conditions. The present inventors conducted detailed investigations to identify the cause of such change in color, and obtained the following findings.

After being produced, surface-treated steel sheets are wound in a coil shape and stored. If high-temperature, high-humidity air is caught in a gap between surface-treated steel sheets in a coil during winding of the coil, condensation water will arise in the gap between the surface-treated steel sheets. Similarly, if high-temperature, high-humidity air enters a gap between surface-treated steel sheets in a coil during storage of the coil, condensation water will arise in the gap between the surface-treated steel sheets. At the surface of the surface-treated steel sheet, that is, at the alloy layer surface, the oxygen concentration of a portion which comes in contact with the condensation water will be high. In contrast, at the alloy layer surface, the oxygen concentration of a portion which does not come in contact with the condensation water will be low. The potential of the portion of the alloy layer surface where the oxygen concentration is high becomes noble. In contrast, the potential of the portion of the alloy layer surface where the oxygen concentration is low becomes "base". As a result, an oxygen concentration cell is formed. Co is more easily oxidized than Ni. Therefore, Co is oxidized at the portion where the oxygen concentration is low (in other words, the portion where the potential becomes "base"). The surface of the alloy layer changes color due to the oxidized Co.

It is considered that reducing oxidized Co which is the cause of a color change is also effective for suppressing the occurrence of a change in the color of a surface-treated steel sheet. In order to reduce oxidized Co, it is also conceivable to reduce the Co concentration at the surface of the alloy layer. The aforementioned patent literatures describe controlling the Co concentration at the surface of an alloy layer, and in particular controlling the average concentration of Co in a macro visual field at the surface of the alloy layer that can be measured by XPS or AES.

However, the present inventors considered that it is insufficient to merely reduce the average concentration of Co in a macro visual field at the surface of the alloy layer. Specifically, even if the occurrence of a color change can be suppressed, there is a possibility that the contact resistance of the surface-treated steel sheet cannot be reduced and the high-rate characteristic of the battery will not be enhanced.

Therefore, the present inventors conducted studies regarding a method for reducing the contact resistance of a surface-treated steel sheet and also suppressing the occurrence of a change in the color of the surface-treated steel sheet.

In the previous studies, the average concentration of Co in a macro visual field at the surface of an alloy layer has been investigated. However, in the previous studies, the manner in which Co is distributed when observed in a micro visual field has not been investigated. Further, in the previous studies, the Co concentration in a very shallow range at the surface of an alloy layer is measured. However, in the previous studies, the manner in which Co is distributed in an outer layer (range to a depth of 100 nm from the surface of the alloy layer) of the alloy layer has not been investigated. Therefore, unlike the previous studies, the present inventors considered that it is effective to control the distribution of Co within a micro visual field, and not the average concentration of Co within a macro visual field. In addition, the present inventors considered that it is effective to control the distribution of Co in a range from the surface of the alloy layer to a depth of 100 nm (hereunder, also referred to as "outer layer of the alloy layer"), and not the Co concentration in a very shallow range at the surface of the alloy layer. The present inventors considered that by controlling the distribution of Co in this way it is possible to both realize low contact resistance of a surface-treated steel sheet and also suppress the occurrence of a change in the color of the surface-treated steel sheet in a compatible manner. Specifically, regions with a high Co concentration and regions with a low Co concentration are intentionally formed in the outer layer of the alloy layer. In addition, these two types of regions are intermixed in a micro size so as to be distributed with appropriate uniformity. It is considered that, by this means, both low contact resistance and suppression of a change in the color of a surface-treated steel sheet can be compatibly achieved. This is described more specifically hereunder.

A high Co concentration region is arranged in the outer layer of the alloy layer. By this means, the contact resistance of the surface-treated steel sheet can be reduced. In the previous studies, attention has been focused on the Co concentration in a very shallow range at the surface of the alloy layer. However, no conclusion has been reached regarding to what depth of the Co concentration in the alloy layer the contact resistance is affected by. The present inventors considered that the contact resistance of a surface-treated steel sheet can be reduced by increasing the average Co concentration in a range from the surface of the alloy layer to a depth of 100 nm, and not a very shallow range at the surface of the alloy layer. Specifically, a high Co concentration region is arranged in the outer layer of the alloy layer. The term "high Co concentration region" refers to a region in which a ratio of the Co concentration to the sum of the Co concentration and the Ni concentration in a range from the surface of the alloy layer to a depth of 100 nm is 0.8 or more. Since the contact resistance is particularly low in a high Co concentration region, when current flows through the outer layer of the surface-treated steel sheet, the contact resistance of the entire surface-treated steel sheet can be reduced by the high Co concentration region.

There is a correlation between the ratio of the Co concentration to the sum of the Co concentration and the Ni concentration in a certain region of the alloy layer and a change in the color of that region. A region that is composed of only Co, that is, a region having a Co concentration of 100% is most liable to be colored. In a case where a region having a Co concentration of 100% is colored, the region is colored in the darkest color. In a high Co concentration region, as mentioned above, because the Co concentration is high, oxidized Co is easily generated and colored. Therefore, when the outer layer of the alloy layer is composed of only a high Co concentration region, even if the contact resistance of the surface-treated steel sheet can be reduced, the occurrence of a change in the color of the surface-treated steel sheet cannot be suppressed. Therefore, a region in which the Co concentration is lower than in a high Co concentration region, that is, a region where alloying of Co and Ni is more advanced is formed in the outer layer of the alloy layer.

In the alloy layer, a region that is an alloy of Ni and Co is less liable to be colored in comparison to a region that consists only of Co. When a region that is an alloy of Ni and Co is colored, the color is light. In other words, it is more difficult for a region where the ratio of the Co concentration to the sum of the Co concentration and the Ni concentration is less than 0.8 to become colored compared to a region where the ratio of the Co concentration to the sum of the Co concentration and the Ni concentration is 0.8 or more. Such a region where the ratio of the Co concentration to the sum of the Co concentration and the Ni concentration is less than 0.8 is defined as an "alloyed region". By forming the alloyed region in the outer layer of the alloy layer, a region which it is difficult to color is obtained in the outer layer of the alloy layer.

In addition, micro high Co concentration regions and micro alloyed regions are caused to intermix in the outer layer of the alloy layer. Further, the high Co concentration regions and the alloyed regions are controlled so as to be uniformly distributed to a certain extent with respect to each other. In this case, the high Co concentration regions and the alloyed regions are alternately arranged, that is, arranged in a striped pattern, within a range that has a width of 2000 nm and that extends from the surface of the alloy layer to a depth of 100 nm in a cross section obtained when the alloy layer is cut in the thickness direction. Even in a case where high Co concentration regions in the micro visual field are colored, it is difficult for alloyed regions that are adjacent to the high Co concentration regions to be colored. Therefore, even in a case where high Co concentration regions are colored, a change in color can be suppressed when the entire surface-treated steel sheet is observed in a macro visual field.

As described in the foregoing, high Co concentration regions that are regions where the ratio of the Co concentration to the sum of the Co concentration and the Ni concentration is 0.8 or more and alloyed regions that are regions where the ratio of the Co concentration to the sum of the Co concentration and the Ni concentration is less than 0.8 are arranged alternately in a range having a width of 2000 nm in the alloy layer and extending from the surface of the alloy layer to a depth of 100 nm. In the surface-treated steel sheet of the present disclosure, as mentioned above, the point that the high Co concentration regions and the alloyed regions are arranged alternately in a micro visual field with a width of 2000 nm is important. By forming the high Co concentration regions in the outer layer of the alloy layer, the contact resistance of the surface-treated steel sheet can be reduced. Further, the alloyed regions which do not easily color are arranged in the same outer layer of the alloy layer as the high Co concentration regions. In addition, in the micro visual field with a width of 2000 nm, the high Co concentration regions and the alloyed regions are alternately arranged. By this means, a change in the color of the overall surface-treated steel sheet can be suppressed while maintaining low contact resistance of the surface-treated steel sheet. In other words, by intentionally forming different Co concentrations in a micro visual field at the surface of the surface-treated steel sheet, for the first time it is possible to achieve both a reduction in the contact resistance of a surface-treated steel sheet and also the suppression of the occurrence of a change in the color of the surface-treated steel sheet. More specifically, high Co concentration regions in which a Co concentration is high, and alloyed regions in which a Co concentration is low are arranged alternately in a micro visual field that has a width of 2000 nm. By this means, the contact resistance of the surface-treated steel sheet can be reduced and changes in the color of the surface-treated steel sheet can be suppressed in a compatible manner.

As described above, the surface-treated steel sheet of the present disclosure has been completed based on an idea that is completely different from previous ideas, and is as follows.

[1]

A surface-treated steel sheet, including:

a steel sheet, and an alloy layer containing Ni and Co on a surface of the steel sheet, wherein, in a case where, in a cross section obtained by cutting the alloy layer in a thickness direction, a range having a width of 2000 nm and extending from a surface of the alloy layer to a depth of 100 nm is partitioned into regions each having a width of 100 nm and a depth of 100 nm, within the range the alloy layer includes:

a plurality of high Co concentration regions in each of which a ratio of a Co concentration to a sum of the Co concentration and a Ni concentration within the partitioned region is 0.8 or more, and a plurality of alloyed regions in each of which a ratio of the Co concentration to a sum of the Co concentration and the Ni concentration within the partitioned region is less than 0.8, the plurality of alloyed regions being arranged alternately with the high Co concentration regions.

[2]
The surface-treated steel sheet according to [1], wherein:
in the range which, in the cross section obtained by cutting the alloy layer in the thickness direction of the alloy layer, has a width of 2000 nm and extends to a depth of 100 nm from the surface of the alloy layer, a ratio of an area of the high Co concentration regions to an area of the alloyed regions is 0.10 to 4.00.

[3]
The surface-treated steel sheet according to [1] or [2], wherein:
per side of the steel sheet, a content of Ni in the alloy layer is 1.34 to 5.36 g/m$^2$, and a content of Co in the alloy layer is 0.45 to 1.34 g/m$^2$.

[4]
The surface-treated steel sheet according to [1] or [2], wherein:
per side of the steel sheet, a content of Ni in the alloy layer is 5.36 to 35.6 g/m$^2$, and a content of Co in the alloy layer is 0.45 to 1.34 g/m$^2$.

Hereunder, the surface-treated steel sheet of the present embodiment is described in detail.

[Surface-Treated Steel Sheet]

Figure 2:
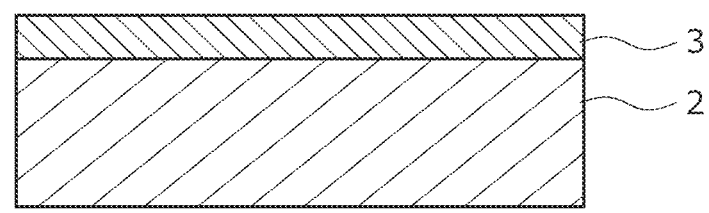
FIG. 2 is a cross-sectional diagram illustrating one example of a surface-treated steel sheet of another embodiment that is different from the example in FIG. 1.

A surface-treated steel sheet of the present embodiment includes a steel sheet, and an alloy layer containing Ni and Co on the steel sheet surface. FIG. 1 is a cross-sectional diagram illustrating one example of the surface-treated steel sheet of the present embodiment. Referring to FIG. 1, a surface-treated steel sheet 1 of the present embodiment includes a steel sheet 2 and an alloy layer 3. The alloy layer 3 is arranged on a surface of the steel sheet 2. In FIG. 1, the alloy layer 3 is arranged on both sides of the steel sheet 2. However, the arrangement of the alloy layer 3 is not limited to the example illustrated in FIG. 1. As illustrated in FIG. 2, the alloy layer 3 may be arranged on only one side of the steel sheet 2.

Figure 3:
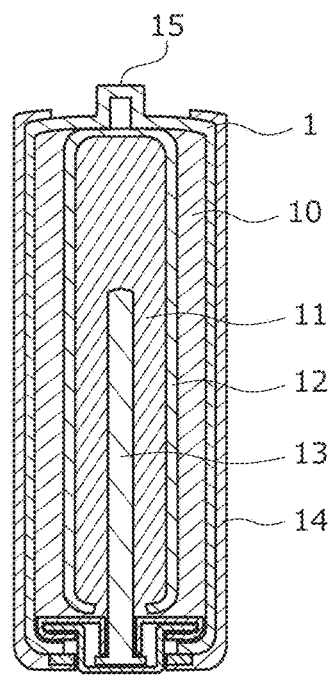
FIG. 3 is a cross-sectional diagram illustrating an example of an alkaline battery which uses the surface-treated steel sheet of the present embodiment.

The surface-treated steel sheet 1 of the present embodiment can be used for battery applications, such as for primary batteries and secondary batteries. The term "primary battery" refers to, for example, an alkaline battery and a manganese battery. The term "secondary battery" refers to, for example, a lithium ion battery. FIG. 3 is a cross-sectional diagram illustrating an example of an alkaline battery which uses the surface-treated steel sheet 1 of the present embodiment. Referring to FIG. 3, the surface-treated steel sheet 1 is processed into the shape of a battery container. A manganese dioxide 10 that is the positive electrode, zinc 11 that is the negative electrode, a separator 12, and a current collector 13 are enclosed inside the container formed of the surface-treated steel sheet 1. The positive electrode 10 and the negative electrode 11 are immersed in an electrolyte. The outer side of the container formed by the surface-treated steel sheet 1 is covered with an insulator 14. A protrusion at the top part of the alkaline battery in FIG. 3 is a positive electrode terminal 15. When used as a battery container, the surface-treated steel sheet 1 functions as a battery container and as a current collector. In a case where the alloy layer 3 is arranged on only one side of the steel sheet 2, it is preferable that the alloy layer 3 is arranged on the inner side of the battery container.

[Preferable Thickness of Surface-Treated Steel Sheet]

Although the thickness of the surface-treated steel sheet 1 of the present embodiment is not particularly limited, for example the thickness is 0.05 to 1.5 mm. In the case of use for a battery such as an alkaline battery, for example, the thickness is 0.1 to 1.0 mm. The thickness of the surface-treated steel sheet 1 can be measured by a well-known method. The thickness of the surface-treated steel sheet 1, for example, may be measured by cutting the surface-treated steel sheet 1 in the thickness direction and performing measurement by observing an obtained cross section using an optical microscope, or may be measured using a well-known film thickness gauge.

[Alloy Layer]

The alloy layer 3 contains Ni and Co. The alloy layer 3 may also contain iron (Fe). As will be described later, for example, the alloy layer 3 can be produced by the following production method. First, the steel sheet 2 is prepared. Next, a Ni plating layer is formed on the surface of the steel sheet 2, and a Co plating layer is formed on the Ni plating layer. Lastly, the steel sheet 2 including the Ni plating layer and the Co plating layer is subjected to an alloying heat treatment. The alloying heat treatment causes Ni in the Ni plating layer and Co in the Co plating layer to diffuse with each other, thereby forming the alloy layer 3. At such time, iron (Fe) contained in the steel sheet 2 may diffuse into the alloy layer 3. Therefore, the alloy layer 3 may contain Fe in addition to Ni and Co. Each of the Ni, Co and Fe may be partially present in the thickness direction of the alloy layer 3, or may be present over the entire thickness direction of the alloy layer 3. In other words, in the surface-treated steel sheet 1 of the present embodiment, all of Ni, Co and Fe need not be constantly contained over the whole area in the thickness direction of the alloy layer 3.

Figure 4:
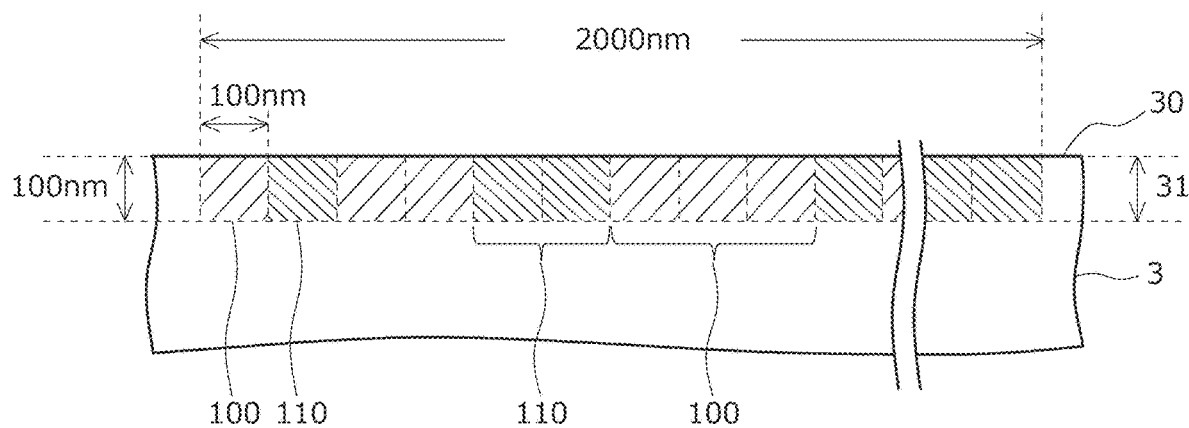
FIG. 4 is an enlarged view of a cross section obtained by cutting an alloy layer in the thickness direction.

FIG. 4 is an enlarged view of a cross section obtained by cutting the alloy layer 3 in the thickness direction. Referring to FIG. 4, in a range having a width of 2000 nm and extending from a surface 30 of the alloy layer 3 to a depth of 100 nm in a cross section obtained by cutting the alloy layer 3 in the thickness direction, the alloy layer 3 of the surface-treated steel sheet 1 of the present embodiment includes a plurality of high Co concentration regions 100 and a plurality of alloyed regions 110. Dashed lines in FIG. 4 are virtual lines that, in the alloy layer 3, partition a range having a width of 2000 nm and extending from the surface 30 of the alloy layer 3 to a depth of 100 nm into regions each having a width of 100 nm and a depth of 100 nm. Note that, in the present description, the range from the surface 30 of the alloy layer 3 to a depth of 100 nm is also referred to as an outer layer 31 of the alloy layer 3.

[Thickness of Alloy Layer]

The thickness of the alloy layer 3 in the present embodiment is measured by glow discharge spectrometry (GDS). Specifically, GDS analysis is performed in the thickness direction of the surface-treated steel sheet 1 from the surface of the alloy layer toward the inside of the alloy layer using a radio-frequency glow discharge optical emission spectrometer (manufactured by Horiba Ltd., model: GD-Profiler 2). The GDS analysis is performed under the following conditions: H.V.: 720 V for Co, negative electrode diameter: ψ4 mm, gas: Ar, gas pressure: 600 Pa, and output: 35 W. A region from the surface of the alloy layer to a position at which the intensity of a Co peak is 1/10 of the maximum intensity of the Co peak is defined as the thickness of the alloy layer of the present embodiment. The lower limit of the thickness of the alloy layer 3 is 100 nm. The upper limit of the thickness of the alloy layer 3 is, for example, 1000 nm.

[High Co Concentration Regions]

The alloy layer 3 includes a plurality of high Co concentration regions 100. In a cross section obtained by cutting the alloy layer 3 in the thickness direction, the high Co concentration regions 100 are present within a range having a width of 2000 nm and extending to a depth of 100 nm from the surface 30 of the alloy layer 3. When the aforementioned range is partitioned into regions each having a width of 100 nm and a depth of 100 nm in a manner so that the respective regions do not overlap, a region in which the ratio of the Co concentration to the sum of the Co concentration and the Ni concentration is 0.8 or more is defined as the high Co concentration region 100. The contact resistance is particularly low in the high Co concentration regions 100. Therefore, if the surface-treated steel sheet 1 includes the high Co concentration regions 100 in the outer layer 31 of the alloy layer 3, the contact resistance of the surface-treated steel sheet 1 overall can be reduced. In FIG. 4, there is a portion where three regions that are adjacent in the width direction of the aforementioned range are consecutively the high Co concentration regions 100. In this case, the adjacent three high Co concentration regions 100 are taken collectively as one high Co concentration region 100. In other words, in a case where a plurality of high Co concentration regions 100 are adjacent in the width direction of a cross section obtained by cutting the alloy layer 3 in the thickness direction, the adjacent high Co concentration regions 100 are taken collectively as one high Co concentration region 100.

In the high Co concentration region 100, the Co concentration need not be constantly high from the surface 30 of the alloy layer 3 to a depth of 100 nm. In other words, in the high Co concentration region 100, a ratio of the Co concentration to the sum of the Co concentration and the Ni concentration need not be constantly 0.8 or more from the surface 30 of the alloy layer 3 to a depth of 100 nm. The Co concentration in the high Co concentration region 100 may be highest at the surface of the alloy layer 3 and become lower as the distance from the surface of the alloy layer 3 increases in the thickness direction of the alloy layer 3. Naturally, in the high Co concentration region 100, the Co concentration may constantly be high from the surface of the alloy layer 3 to a depth of 100 nm. Further, in the high Co concentration region 100, in the width direction of the aforementioned range, the Co concentration need not be constantly high, and may be partially low. In other words, in the high Co concentration region 100, in the aforementioned width direction, the ratio of the Co concentration to the sum of the Co concentration and the Ni concentration need not be constantly 0.8 or more. Naturally, in the high Co concentration region 100, the Co concentration may constantly be high in the width direction of the aforementioned range. In other words, as long as a ratio of the average Co concentration to a sum of the average Co concentration and the average Ni concentration in a certain region is 0.8 or more, that region is taken to be a high Co concentration region 100.

[Method for Identifying High Co Concentration Region]

The high Co concentration region 100 is identified by the following method. First, the surface-treated steel sheet 1 including the alloy layer 3 is cut in the thickness direction of the alloy layer 3. In the face obtained by cutting the surface-treated steel sheet 1, an inner region that excludes edge vicinity regions having a width of 5 mm from each edge (each end) of the surface-treated steel sheet 1 is adopted as an observation surface. A test specimen for observation by an aberration correction function-equipped transmission electron microscope (Cs-TEM) that has a thickness of about 150 nm including the observation surface is prepared by FIB processing. The observation surface of the obtained test specimen is analyzed by aberration correction function-equipped transmission electron microscope with energy dispersive X-ray spectroscopy (Cs-TEM-EDX). Analysis is performed by irradiation of an electron beam having a beam diameter of about 0.1 nm at a measurement magnification of 40000 to 225000 times and an accelerating voltage of 200 kV, and the respective X-ray intensities of Co-k$\alpha$ line and Ni-k$\alpha$ line are measured. Element mapping images for Co and Ni are created based on the X-ray intensity of each element. Based on the obtained element mapping images, an arbitrary range having a width of 2000 nm and extending to a depth of 100 nm from the surface 30 of the alloy layer 3 in the aforementioned observation surface is selected. This range is partitioned into regions each having a width of 100 nm and a depth of 100 nm in a manner so that the respective regions do not overlap. Each partitioned region is broken down into 100 cells having a width of 10 nm and a depth of 10 nm. The average Co concentration of each of the 100 cells is calculated based on the measurement results obtained by the Cs-TEM-EDX. The calculated Co concentrations of the 100 cells are added together, and the total value of the Co concentrations is divided by 100. In this way, the average Co concentration in each region is determined. The average Ni concentration in each region is determined by the same method. In this way, the Co concentration and the Ni concentration in each region are determined. Among the regions, those regions in which the ratio of the Co concentration to the sum of the Co concentration and the Ni concentration is 0.8 or more are identified. The identified regions are the high Co concentration regions 100.

[Alloyed Region]

The alloy layer 3 includes a plurality of alloyed regions 110. In a cross section obtained by cutting the alloy layer 3 in the thickness direction, the alloyed regions 110 are present in a range having a width of 2000 nm and extending to a depth of 100 nm from the surface 30 of the alloy layer 3. When the aforementioned range is partitioned into regions each having a width of 100 nm and a depth of 100 nm in a manner so that the respective regions do not overlap, a region in which the ratio of the Co concentration to the sum of the Co concentration and the Ni concentration is less than 0.8 is defined as the alloyed region 110. In each alloyed region 110, a predetermined amount or more of Ni is alloyed with Co. Therefore, it is difficult for the alloyed regions 110 to be colored even when exposed to conditions under which oxygen concentration cells are formed. In addition, as described later, the alloyed regions 110 are arranged alternately with the high Co concentration regions 100 in the aforementioned range. By this means, even in a case where, in a micro visual field, the high Co concentration regions 100 are colored, when the entire surface-treated steel sheet 1 is observed in a macro visual field, a change in the color of the surface-treated steel sheet 1 is suppressed. In FIG. 4, there is a portion where two regions that are adjacent in the width direction of the aforementioned range are consecutively the alloyed regions 110. In this case, the adjacent two alloyed regions 110 are taken collectively as one alloyed region 110. In other words, in a case where a plurality of alloyed regions 110 are adjacent in the width direction of a cross section obtained by cutting the alloy layer 3 in the thickness direction, the adjacent alloyed regions 110 are taken collectively as one alloyed region 110.

In the alloyed region 110, the concentration ratio between Co and Ni need not be always constant from the surface of the alloy layer 3 to a depth of 100 nm. In other words, in the alloyed region 110, a ratio of the Co concentration to the sum of the Co concentration and the Ni concentration need not be constantly less than 0.8 from the surface of the alloy layer 3 to a depth of 100 nm. Further, in the alloyed region 110, the concentration ratio between Co and Ni need not be always constant in the width direction of the aforementioned range. In other words, in the alloyed region 110, the ratio of the Co concentration to the sum of the Co concentration and the Ni concentration need not be constantly less than 0.8 in the width direction of the aforementioned range. In other words, as long as a ratio of the average Co concentration to a sum of the average Co concentration and the average Ni concentration in a certain region is less than 0.8, that region is taken to be an alloyed region 110.

[Method for Identifying Alloyed Region]

The alloyed region 110 is identified by the following method. Element mapping images for Co and Ni are created using Cs-TEM-EDX according to the same conditions as the conditions adopted in the aforementioned method for identifying the high Co concentration regions 100. Based on the obtained element mapping images for Co and Ni, in a cross section obtained by cutting the alloy layer 3 in the thickness direction, an arbitrary range having a width of 2000 nm and extending to a depth of 100 nm from the surface 30 of the alloy layer 3 is selected. This range is partitioned into regions each having a width of 100 nm and a depth of 100 nm in a manner so that the respective regions do not overlap. Each partitioned region is broken down into 100 cells having a width of 10 nm and a depth of 10 nm. The average Co concentration of each of the 100 cells is calculated based on the measurement results obtained by the Cs-TEM-EDX. The calculated Co concentrations of the 100 cells are added together, and the total value of the Co concentrations is divided by 100. In this way, the average Co concentration in each region is determined. The average Ni concentration in each region is determined by the same method. In this way, the Co concentration and the Ni concentration in each region are determined. Among the regions, those regions in which the ratio of the Co concentration to the sum of the Co concentration and the Ni concentration is less than 0.8 are identified. The identified regions are the alloyed regions 110.

[Arrangement of High Co Concentration Regions and Alloyed Regions]

In the alloy layer 3, the high Co concentration regions 100 and the alloyed regions 110 are alternately arranged within a range having a width of 2000 nm and extending to a depth of 100 nm from the surface 30 of the alloy layer 3. Referring to FIG. 4, in the outer layer 31 of the alloy layer 3, the high Co concentration regions 100 and the alloyed regions 110 are alternately arranged in the width direction of the aforementioned range. As mentioned above, by this means, a change in the color of the surface-treated steel sheet 1 can be suppressed while reducing the contact resistance of the surface-treated steel sheet 1. Note that, as mentioned above, a plurality of high Co concentration regions 100 that are adjacent are taken collectively as one high Co concentration region 100. Further, a plurality of alloyed regions 110 that are adjacent are taken collectively as one alloyed region 110. Therefore, even when a plurality of high Co concentration regions 100 and a plurality of alloyed regions 110 are adjacent, the high Co concentration regions 100 and the alloyed regions 110 are arranged alternately without fail. The outer layer 31 of the alloy layer 3 consists only of the high Co concentration regions 100 and the alloyed regions 110.

[Method for Identifying Arrangement of High Co Concentration Regions and Alloyed Regions]

The arrangement of the high Co concentration regions 100 and the alloyed regions 110 is identified by the following method. Element mapping images for Co and Ni are created using Cs-TEM-EDX according to the same conditions as the conditions adopted in the aforementioned method for identifying the high Co concentration regions 100. Based on the obtained element mapping images for Co and Ni, in a cross section obtained by cutting the alloy layer 3 in the thickness direction, an arbitrary range having a width of 2000 nm and extending to a depth of 100 nm from the surface 30 of the alloy layer 3 is selected. This range is partitioned into regions each having a width of 100 nm and a depth of 100 nm in a manner so that the respective regions do not overlap. The high Co concentration regions 100 and the alloyed regions 110 are identified by the methods described above. Visual observation is used to identify that the high Co concentration regions 100 and the alloyed regions 110 are arranged alternately in the width direction of the cross section obtained by cutting the alloy layer 3 in the thickness direction. Note that, a plurality of high Co concentration regions 100 that are adjacent are taken collectively as one high Co concentration region 100. Further, a plurality of alloyed regions 110 that are adjacent are taken collectively as one alloyed region 110.

[Preferable Area Ratio Between High Co Concentration Regions and Alloyed Regions]

In a cross section obtained by cutting the alloy layer 3 in the thickness direction, if a ratio of an area of the high Co concentration regions 100 to an area of the alloyed regions 110 in a range having a width of 2000 nm and extending to a depth of 100 nm from the surface 30 of the alloy layer 3 is 0.10 or more, the contact resistance of the surface-treated steel sheet 1 can be reduced more stably. On the other hand, in the aforementioned range, if the ratio of the area of the high Co concentration regions 100 to the area of the alloyed regions 110 is 4.00 or less, a change in the color of the surface-treated steel sheet 1 can be decreased more stably. Therefore, preferably, in the alloy layer 3, in a range having a width of 2000 nm and extending to a depth of 100 nm from the surface 30 of the alloy layer 3 in a cross section obtained by cutting the alloy layer 3 in the thickness direction, the ratio of the area of the high Co concentration regions 100 to the area of the alloyed regions 110 is 0.10 to 4.00. In the aforementioned range, a lower limit of the ratio of the area of the high Co concentration regions 100 to the area of the alloyed regions 110 is more preferably 0.25, further preferably is 0.43, and further preferably is 0.67. In the aforementioned range, an upper limit of the ratio of the area of the high Co concentration regions 100 to the area of the alloyed regions 110 is more preferably 2.33, further preferably is 1.86, and further preferably is 1.50.

[Method for Measuring Area Ratio Between High Co Concentration Regions and Alloyed Regions]

The area ratio between the high Co concentration regions 100 and the alloyed regions 110 is measured by the following method. Element mapping images for Co and Ni are created using Cs-TEM-EDX according to the same conditions as the conditions adopted in the aforementioned method for identifying the high Co concentration regions 100. Based on the obtained element mapping images for Co and Ni, in a cross section obtained by cutting the alloy layer 3 in the thickness direction, an arbitrary range having a width of 2000 nm and extending to a depth of 100 nm from the surface 30 of the alloy layer 3 is selected. This range is partitioned into regions each having a width of 100 nm and a depth of 100 nm in a manner so that the respective regions do not overlap. The partitioned regions are divided into high Co concentration regions 100 and alloyed regions 110 using the same method as the method for identifying the arrangement of the high Co concentration regions 100 and the alloyed regions 110 described above, and the area of the high Co concentration regions 100 and the area of the alloyed regions 110 are determined. Based on the obtained area of the high Co concentration regions 100 and area of the alloyed regions 110, the ratio of the area of the high Co concentration regions 100 to the area of the alloyed regions 110 is determined.

Hereunder, a case where Fe is diffused up to the surface 30 of the alloy layer 3 is also referred to as "complete diffusion". Further, a case where Fe is not diffused up to the surface 30 of the alloy layer 3 is also referred to as "partial diffusion". In the alloy layer 3 of the surface-treated steel sheet 1 of the present embodiment, Fe may be completely diffused or may be partially diffused.

[Preferable Content of Ni and Preferable Content of Co in Alloy Layer]

Preferably, the content of Ni and the content of Co in the alloy layer 3 per side of the steel sheet 2 are as follows.

Content of Ni in Alloy Layer 3: 1.34 to 35.6 g/m$^2$

If the content of Ni in the alloy layer 3 is 1.34 g/m$^2$ or more, an anti-rust property of the surface-treated steel sheet 1 can be more reliably ensured. On the other hand, the necessity for the content of Ni in the alloy layer 3 to be more than 35.6 g/m$^2$ is low since the anti-rust property of the surface-treated steel sheet 1 can be adequately ensured even if the content is more than 35.6 g/m$^2$. If the content of Ni in the alloy layer 3 is 35.6 g/m$^2$ or less, the production cost can be suppressed. Therefore, the content of Ni in the alloy layer 3 is preferably 1.34 to 35.6 g/m$^2$. A more preferable lower limit of the content of Ni in the alloy layer 3 is 2.01 g/m$^2$, and further preferably is 2.75 g/m$^2$. A more preferable upper limit of the content of Ni in the alloy layer 3 is 31.8 g/m$^2$, and further preferably is 28.9 g/m$^2$.

Content of Co in Alloy Layer 3: 0.45 to 1.34 g/m$^2$

If the content of Co in the alloy layer 3 is 0.45 g/m$^2$ or more, the contact resistance of the surface-treated steel sheet 1 can be more stably lowered. On the other hand, with regard to a content of Co of more than 1.34 g/m$^2$ in the alloy layer 3, the low contact resistance of the alloy layer 3 can be adequately ensured. If the content of Co in the alloy layer 3 is 1.34 g/m$^2$ or less, the production cost can be suppressed. Therefore, the content of Co in the alloy layer 3 is preferably 0.45 to 1.34 g/m$^2$. A more preferable lower limit of the content of Co in the alloy layer 3 is 0.52 g/m$^2$, and further preferably is 0.65 g/m$^2$. A more preferable upper limit of the content of Co in the alloy layer 3 is 1.23 g/m$^2$, and further preferably is 1.10 g/m$^2$.

[Preferable Content of Ni and Preferable Content of Co in Alloy Layer in Case of Complete Diffusion]

In the case of complete diffusion, the preferable content of Ni and the preferable content of Co in the alloy layer per side of the steel sheet 2 are preferably as follows.

Content of Ni in Alloy Layer 3 in Case of Complete Diffusion: 1.34 to 5.36 g/m$^2$ If the content of Ni in the alloy layer 3 is 1.34 g/m$^2$ or more, an anti-rust property of the surface-treated steel sheet 1 can be more reliably ensured. On the other hand, if the content of Ni in the alloy layer 3 is 5.36 g/m$^2$ or less, it is easy for Fe to diffuse up to the surface 30 of the alloy layer 3. Therefore, when Fe is to be completely diffused in the alloy layer 3, the content of Ni in the alloy layer 3 is preferably 1.34 to 5.36 g/m$^2$. In the case of complete diffusion, a more preferable lower limit of the content of Ni in the alloy layer 3 is 1.78 g/m$^2$, and further preferably is 2.10 g/m$^2$. In the case of complete diffusion, a more preferable upper limit of the content of Ni in the alloy layer 3 is 5.10 g/m$^2$, and further preferably is 4.85 g/m$^2$.

Content of Co in Alloy Layer 3 in Case of Complete Diffusion: 0.45 to 1.34 g/m$^2$ If the content of Co in the alloy layer 3 is 0.45 g/m$^2$ or more, the contact resistance of the surface-treated steel sheet 1 can be more stably lowered. On the other hand, with regard to a content of Co of more than 1.34 g/m$^2$ in the alloy layer 3, the low contact resistance of the alloy layer 3 can be adequately ensured. If the content of Co in the alloy layer 3 is 1.34 g/m$^2$ or less, the production cost can be suppressed. Therefore, the content of Co in the alloy layer 3 in the case of complete diffusion is preferably 0.45 to 1.34 g/m$^2$. A more preferable lower limit of the content of Co in the alloy layer 3 in the case of complete diffusion is 0.55 g/m$^2$, and further preferably is 0.65 g/m$^2$. A more preferable upper limit of the content of Co in the alloy layer 3 in the case of complete diffusion is 1.22 g/m$^2$, and further preferably is 1.10 g/m$^2$.

[Preferable Content of Ni and Preferable Content of Co in Alloy Layer in Case of Partial Diffusion]

In the case of partial diffusion, the preferable content of Ni and the preferable content of Co in the alloy layer per side of the steel sheet 2 are preferably as follows.

Content of Ni in Alloy Layer 3 in Case of Partial Diffusion: 5.36 to 35.6 g/m$^2$ If the content of Ni in the alloy layer 3 is 5.36 g/m$^2$ or more, it will be difficult for Fe to diffuse up to the surface 30 of the alloy layer 3. On the other hand, the necessity for the content of Ni in the alloy layer 3 to be more than 35.6 g/m$^2$ is low since the anti-rust property of the surface-treated steel sheet 1 can be adequately ensured even if the content is more than 35.6 g/m$^2$. If the content of Ni in the alloy layer 3 is 35.6 g/m$^2$ or less, the production cost can be suppressed. Therefore, in a case where Fe is to be partially diffused in the alloy layer 3, the content of Ni in the alloy layer 3 is preferably 5.36 to 35.6 g/m$^2$. In the case of partial diffusion, a more preferable lower limit of the content of Ni in the alloy layer 3 is 5.70 g/m$^2$, and further preferably is 6.00 g/m$^2$. In the case of partial diffusion, a more preferable upper limit of the content of Ni in the alloy layer 3 is 32.5 g/m$^2$, and further preferably is 28.9 g/m$^2$.

Content of Co in Alloy Layer 3 in Case of Partial Diffusion: 0.45 to 1.34 g/m$^2$ If the content of Co in the alloy layer 3 is 0.45 g/m$^2$ or more, the contact resistance of the surface-treated steel sheet 1 can be more stably lowered. On the other hand, with regard to a content of Co of more than 1.34 g/m$^2$ in the alloy layer 3, the low contact resistance of the alloy layer 3 can be adequately ensured. If the content of Co in the alloy layer 3 is 1.34 g/m$^2$ or less, the production cost can be suppressed. Therefore, in the case of partial diffusion, the content of Co in the alloy layer 3 is preferably 0.45 to 1.34 g/m$^2$. A more preferable lower limit of the content of Co in the alloy layer 3 in the case of partial diffusion is 0.55 g/m$^2$, and further preferably is 0.65 g/m$^2$. A more preferable upper limit of the content of Co in the alloy layer 3 in the case of partial diffusion is 1.22 g/m$^2$, and further preferably is 1.10 g/m$^2$.

The chemical composition of the alloy layer 3 of the surface-treated steel sheet 1 of the present embodiment may be a chemical composition consisting of Co, Ni, Fe and impurities. The impurities are, for example, one or more elements selected from the group consisting of carbon (C), oxygen (O), aluminum (Al), silicon (Si), phosphorus (P), manganese (Mn), copper (Cu) and sulfur (S).

[Method for Measuring Content of Ni and Content of Co in Alloy Layer]

The content of Ni and content of Co in the alloy layer 3 are measured by the following method. The surface-treated steel sheet 1 including the alloy layer 3 is prepared. The surface-treated steel sheet 1 is cut in the thickness direction, and a cross section that excludes edge vicinity regions having a width of 5 mm from each edge (each end) of the surface-treated steel sheet 1 is observed using a scanning electron microscope, and the thickness of the alloy layer 3 is measured. Next, a sample having a predetermined area that includes the alloy layer 3 is extracted from inside an inner region that excludes edge vicinity regions having a width of 5 mm from each edge (each end) of the surface-treated steel sheet 1. The alloy layer 3 is dissolved in a mixed acid of concentrated hydrochloric acid: concentrated nitric acid=1:1. The time of the dissolution treatment is set according to the thickness of the alloy layer 3 measured earlier. The obtained solution is analyzed by high-frequency inductively coupled plasma (ICP) emission spectrometry. The content of Ni ($g/m^2$) and the content of Co ($g/m^2$) in the alloy layer 3 are determined based on the obtained results and the area of the sample.

[Impedance]

An impedance value (Ω) of the surface-treated steel sheet 1 of the present embodiment is preferably 50 (0) or less. Here, the term "impedance value (Ω)" refers to an impedance value (Ω) at a frequency of 0.1 Hz, which is measured after the surface-treated steel sheet 1 is held at a constant potential for 10 days at 0.3 V vs. Hg/HgO in a 35% KOH aqueous solution at 60° C. The upper limit of the impedance value (Ω) is more preferably 45, further preferably is 40, further preferably is 30, further preferably is 20, further preferably is 10, and further preferably is 5. The lower limit of the impedance value (Ω) is not particularly limited, and for example is 1.

[Color Difference]

A color difference (ΔE*) of the surface-treated steel sheet 1 of the present embodiment is preferably 4.5 or less. Here, the term "color difference (ΔE*)" refers to a color difference (ΔE*) determined based on L*a*b* values obtained before and after holding the surface-treated steel sheet 1 at a temperature of 40° C. and a humidity of 90% rh for 10 days. The upper limit of the color difference (ΔE*) is more preferably 4.3, further preferably 4.0, further preferably 3.8, further preferably 3.5, further preferably 3.3, further preferably 3.0, further preferably 2.7, further preferably 2.5, further preferably 2.3, further preferably 2.1, further preferably 2.0, further preferably 1.9, and further preferably 1.6. The lower limit of the color difference (ΔE*) is not particularly limited, and for example is 0.

[Steel Sheet]

The chemical composition of the steel sheet 2 is not particularly limited. The steel sheet 2 may be selected, for example, from the group consisting of low carbon steel containing carbon (C) in an amount of 0.25 in percent by mass or less, ultra-low carbon steel containing carbon (C) in an amount of less than 0.01 in percent by mass, and non-aging ultra-low carbon steel obtained by adding Ti and Nb to an ultra-low carbon steel. Cold-rolled steel sheets made of low carbon steel are, for example, defined as SPCC, SPCD, SPCE, SPCF and SPCG in JIS G3141 (2017). The steel sheet 2 may be any of these cold-rolled steel sheets. Further, the steel sheet 2 may be aluminum-killed steel.

As described above, the surface-treated steel sheet 1 of the present embodiment includes the steel sheet 2, and the alloy layer 3 containing Ni and Co on the surface of the steel sheet 2, and in a case where, in a cross section obtained by cutting the alloy layer 3 in the thickness direction, a range having a width of 2000 nm and extending to a depth of 100 nm from the surface 30 of the alloy layer 3 is partitioned into regions each having a width of 100 nm and a depth of 100 nm, the alloy layer 3 includes, within the range, a plurality of high Co concentration regions 100, and a plurality of alloyed regions 110 arranged alternately with the high Co concentration regions 100. Therefore, in the surface-treated steel sheet 1 of the present embodiment, the contact resistance is low and a change in the color of the surface can be suppressed.

[Production Method]

A method for producing the aforementioned surface-treated steel sheet 1 of the present embodiment will now be described. The method for producing the surface-treated steel sheet 1 described hereunder is one example of a method for producing the surface-treated steel sheet 1 of the present embodiment. Accordingly, the surface-treated steel sheet 1 composed as described above may be produced by another production method that is different from the production method described hereunder. However, the production method described hereunder is a preferable example of a method for producing the surface-treated steel sheet 1 of the present embodiment.

The method for producing the surface-treated steel sheet 1 of the present embodiment includes a process of preparing the steel sheet 2 (steel sheet preparation process), a process of forming an Ni plating layer of a surface of the steel sheet 2 (Ni plating process), a process of forming a Co plating layer on the Ni plating layer (Co plating process), a process of subjecting the steel sheet 2 having the Ni plating layer and the Co plating layer to an alloying heat treatment (alloying heat treatment process), and a process of subjecting the steel sheet 2 that underwent the alloying heat treatment to temper rolling (temper rolling process). Each of these processes is described hereunder.

[Steel Sheet Preparation Process]

In the steel sheet preparation process, the aforementioned steel sheet 2 is prepared. The steel sheet 2 may be supplied by a third party or may be produced. In the case of producing the steel sheet 2, for example, the steel sheet 2 is produced by the following method. Molten steel having the aforementioned chemical composition is produced. The produced molten steel is used to produce a cast piece. The produced cast piece is subjected to hot rolling, pickling, and cold rolling. Annealing and temper rolling may be performed after the cold rolling. The steel sheet 2 can be produced by the above process. The thickness of the steel sheet 2 is not particularly limited, and is selected according to the intended use of the surface-treated steel sheet 1. The thickness of the steel sheet 2 is, for example, 0.05 to 1.5 mm. In a case where the intended use is for a battery such as an alkaline battery, for example, the thickness is 0.1 to 1.0 mm.

[Ni Plating Process]

In the Ni plating process, an Ni plating layer consisting of Ni and impurities is formed on the surface of the steel sheet 2. Specifically, the steel sheet 2 is brought into contact with an Ni plating bath, and electroplating or electroless plating is performed. The Ni plating process may be performed by immersing the steel sheet 2 in an Ni plating bath and performing electroplating. A well-known Ni plating bath can be used as the Ni plating bath. The Ni plating bath, for example, is selected from the group consisting of a Watts bath, a sulfamate bath, a Wood's bath, a borofluoride bath, a chloride bath and a citrate bath. The Ni plating bath contains Ni ions. The content of Ni ions is, for example, 50 to 500 g/L. The Ni ions may be added to the Ni plating bath as one or more kinds selected from the group consisting of nickel sulfate, ammonium nickel sulfate, nickel chloride, nickel sulfamate and metallic nickel. The Ni plating bath may contain other components in addition to Ni ions. The other components are, for example, one or more kinds selected from the group consisting of boric acid, hydrochloric acid, zinc sulfate, sodium thiocyanate, citric acid, a brightener, a pH adjustor and a surface active agent. The other components are set as appropriate according to the type of Ni plating bath.

The plating conditions such as the Ni plating bath temperature, the pH of the Ni plating bath, and the Ni plating treatment time can be set as appropriate. For example, plating may be performed under conditions of an Ni plating bath temperature of 25 to 70° C. and a pH of the Ni plating bath of 1 to 5. In the case of electroplating, plating may be performed under conditions of a current density of 1 to 50 A/dm$^2$, and an Ni plating treatment time of 10 to 300 seconds. By setting the current density to 1 A/dm$^2$ or more, a preferable Ni coating weight is easily obtained. By setting the current density to 50 A/dm$^2$ or less, plating surface burns and the like can be prevented.

In the Ni plating layer formation process, for example, a Watts bath containing nickel (II) sulfate hexahydrate: 250 to 380 g/L, nickel (II) chloride hexahydrate: 0.40 to 80 g/L, and boric acid: 20 to 55 g/L may be used. Using this Watts bath, electroplating may be performed under conditions in which the pH of the Ni plating bath is 3.5 to 4.5, the Ni plating bath temperature is 45 to 55° C., the current density is 1 to 40 A/dm$^2$, and the Ni plating treatment time is 20 to 100 seconds. By this means, an Ni plating layer consisting of Ni and impurities can be formed on the surface of the steel sheet 2.

The Ni coating weight of the Ni plating layer is the same as the aforementioned content of Ni in the alloy layer 3. In other words, preferably the plating conditions are adjusted so that the Ni coating weight per side of the steel sheet 2 falls within the range of 1.34 to 35.6 g/m$^2$. In a case where Fe is to be completely diffused in the alloy layer 3, preferably the Ni coating weight is 1.34 to 5.36 g/m$^2$. In a case where Fe is to be partially diffused in the alloy layer 3, preferably the Ni coating weight is 5.36 to 35.6 g/m$^2$.

[Co Plating Process]

In the Co plating process, a Co plating layer consisting of Co and impurities is formed on the Ni plating layer. Specifically, the Ni plating layer on the surface of the steel sheet 2 is brought into contact with a Co plating bath, and electroplating is performed. The steel sheet 2 having the Ni plating layer may be immersed in a Co plating bath to perform electroplating. A commercially available Co plating bath can be used as the Co plating bath. The Co plating bath contains Co ions. The content of Co ions is, for example, 30 to 500 g/L. The Co ions may be added to the Co plating bath as one or more kinds selected from the group consisting of cobalt sulfate and cobalt chloride. The Co plating bath may contain other components in addition to Co ions. The other components are, for example, one or more kinds selected from the group consisting of formic acid, boric acid, hydrochloric acid, zinc sulfate, sodium thiocyanate, citric acid, a brightener, a pH adjustor and a surface active agent. The other components are set as appropriate according to the type of Co plating bath.

The plating conditions such as the Co plating bath temperature, the pH of the Co plating bath, and the Co plating treatment time can be set as appropriate. For example, plating may be performed under conditions of a Co plating bath temperature of 25 to 70° C. and a pH of the Co plating bath of 1 to 5. In the case of electroplating, plating may be performed under conditions of a current density of 1 to 50 A/dm$^2$, and a Co plating treatment time of 2 to 50 seconds.

In the Co plating layer formation process, for example, a Co plating bath containing cobalt (II) sulfate heptahydrate: 240 to 330 g/L, boric acid: 20 to 55 g/L, formic acid: 15 to 30 g/L, and sulfuric acid: 0.5 to 3 g/L may be used. Using this Co plating bath, electroplating may be performed under conditions in which the pH of the Co plating bath is 1.0 to 3.0, the Co plating bath temperature is 50 to 60° C., the current density is 1 to 40 A/dm$^2$, and the Co plating treatment time is 5 to 30 seconds. By this means, a Co plating layer consisting of Co and impurities can be formed on the Ni plating layer.

The Co coating weight of the Co plating layer is the same as the aforementioned content of Co in the alloy layer 3. In other words, preferably the plating conditions are adjusted so that the Co coating weight per side of the steel sheet 2 falls within the range of 0.45 to 1.34 g/m$^2$.

In the present embodiment, by adjusting the conditions of the alloying heat treatment process, the high Co concentration regions 100 and the alloyed regions 110 are arranged alternately in the outer layer 31 of the alloy layer 3. In other words, by performing an alloying heat treatment under appropriate conditions, in a case where, in a cross section obtained by cutting the alloy layer 3 in the thickness direction, a range having a width of 2000 nm and extending to a depth of 100 nm from the surface 30 of the alloy layer 3 is partitioned into regions each having a width of 100 nm and a depth of 100 nm, the alloy layer 3 includes, within the range, a plurality of high Co concentration regions 100, and a plurality of alloyed regions 110 that are arranged alternately with the high Co concentration regions 100. By this means, the contact resistance of the surface-treated steel sheet 1 is reduced, and a change in the color of the surface-treated steel sheet 1 can be suppressed.

[Alloying Heat Treatment Process]

In the alloying heat treatment process, the steel sheet 2 having the Ni plating layer and the Co plating layer is subjected to an alloying heat treatment. By performing the alloying heat treatment, Ni of the Ni plating layer, Co of the Co plating layer, and Fe contained in the steel sheet 2 diffuse with each other, and the alloy layer 3 is formed. A well-known heating furnace can be used as the alloying heat treatment furnace. The alloying heat treatment may be performed, for example, by continuously supplying the steel sheet 2 into the heating furnace. The atmospheric gas during the alloying heat treatment is not particularly limited, and for example is $N_2$+2 to 4% $H_2$.

Treatment Temperature: 715 to 850° C.

If the treatment temperature during the alloying heat treatment is less than 715° C., mutual diffusion between Ni and Co will be insufficient. In this case, the adhesion of the alloy layer 3 will decrease. On the other hand, if the treatment temperature during the alloying heat treatment is more than 850° C., the hardness of the steel sheet 2 will decrease. Therefore, the treatment temperature during the alloying heat treatment is 715 to 850° C.

Alloying Heat Treatment Time: 10 to 45 Seconds

If the alloying heat treatment time is less than 10 seconds, mutual diffusion between Ni and Co will be insufficient. In this case, the adhesion of the alloy layer 3 will decrease. On the other hand, if the alloying heat treatment time is more than 45 seconds, the hardness of the steel sheet 2 will decrease. Therefore, the alloying heat treatment time is 10 to 45 seconds. Here, the term "alloying heat treatment time" refers to the holding time of the steel sheet 2 at the aforementioned treatment temperature during the alloying heat treatment.

Average Heating Rate from 500° C. to Treatment Temperature: 13° C./Sec or More

With regard to the steel sheet 2 during the alloying heat treatment, when the average heating rate from 500° C. to the aforementioned treatment temperature is 13° C./sec or more, a larger amount of heat is imparted to the outer layer 31 (the range from the surface 30 of the alloy layer 3 to a depth of 100 nm) of the alloy layer 3. As a result, alloying of the outer layer 31 of the alloy layer 3 is promoted. By this means, Ni is alloyed at some parts of a place where the Co plating had been formed before the alloying heat treatment. As a result, the alloyed regions 110 where a ratio of the Co concentration to the sum of the Co concentration and the Ni concentration is less than 0.8 are formed. Further, on the precondition that the average heating rate from 500° C. to the aforementioned treatment temperature is set to 13° C./sec or more, the treatment temperature during the alloying heat treatment is set to 715 to 850° C., and in addition, the alloying heat treatment time is set to 10 to 45 seconds. By this means, excessive alloying is suppressed. As a result, at some parts of a place where the Co plating had been formed before the alloying heat treatment, the Co plating remains as it is or some of the Co alloys with Ni and the high Co concentration regions 100 are formed. If an alloying heat treatment is performed in which the treatment temperature during the alloying heat treatment is set to 715 to 850° C., the alloying heat treatment time is set to 10 to 45 seconds, and furthermore, the average heating rate from 500° C. to the aforementioned treatment temperature is set to 13° C./sec or more, in the outer layer 31 of the alloy layer 3, micro high Co concentration regions 100 and micro alloyed regions 110 will intermix and will be distributed with moderate uniformity. In this case, in the outer layer 31 of the alloy layer 3, the high Co concentration regions 100 and the alloyed regions 110 are arranged alternately in the width direction of a cross section obtained by cutting the alloy layer 3 in the thickness direction.

The surface-treated steel sheet 1 with the alloy layer 3 formed by the alloying heat treatment is cooled. The cooling is performed by a well-known method. The cooling is, for example, gas cooling. The surface-treated steel sheet 1 may be cooled from the alloying heat treatment temperature to about 100° C. by gas cooling.

[Temper Rolling Process]

In the temper rolling process, temper rolling is performed on the steel sheet 2 subjected to the alloying heat treatment. By appropriately setting the temper rolling conditions, the thickness, total elongation, press formability, and yield strength and the like of the surface-treated steel sheet 1 can be adjusted. The rolling reduction in the temper rolling is, for example, 0.5 to 10.0%.

The surface-treated steel sheet 1 of the present embodiment can be produced by the production processes described above. Note that, the method for producing the surface-treated steel sheet 1 of the present embodiment may include another process in addition to the processes described above.

[Other Process]

An example of another process is a preparation process. The preparation process may be performed before the Ni plating process.

[Preparation Process]

A preparation process may be performed before the Ni plating process. In the preparation process, the surface of the prepared steel sheet 2 is subjected to pickling and/or alkaline degreasing, to thereby remove an oxide film and impurities at the surface of the steel sheet 2. As a result, the adhesion of the Ni plating layer increases. Further, plating electrodeposition defects of the Ni plating layer can be reduced.

Examples

Hereunder, advantageous effects of the surface-treated steel sheet of the present embodiment will be described more specifically by way of Examples. The conditions adopted in the following Examples are one example of conditions which are employed for confirming the workability and advantageous effects of the surface-treated steel sheet of the present embodiment. Accordingly, the surface-treated steel sheet of the present embodiment is not limited to this one example of the conditions.

[Steel Sheet Preparation Process]

Steel sheets consisting of aluminum-killed steel having a thickness of 0.30 mm were prepared. The steel sheets had a chemical composition consisting of C: 0.0090%, Si: 0.006%, Mn: 0.12%, P: 0.012%, S: 0.0088%, sol. Al: 0.047%, and N: 0.0025%, with the balance being Fe and impurities. The steel sheets were subjected to preparations consisting of alkaline degreasing and pickling.

[Ni Plating Process]

A Ni plating layer was formed on the surface of the respective steel sheets that had been subjected to the preparations. The Ni plating layer was formed on both sides of each steel sheet. The obtained Ni plating layer was a plating layer consisting of Ni and impurities. The Ni plating conditions for each test number are shown below.

TABLE 1

| | Ni Plating Bath Composition | | | | | Ni Plating Conditions | | |
| --- | --- | --- | --- | --- | --- | --- | --- | --- |
| Test No. | Nickel (II) Sulfate Hexahydrate (g/L) | Nickel (II) Chloride Hexahydrate (g/L) | Boric Acid (g/L) | Ni Ions Concentration (g/L) | pH | Ni Plating Bath Temperature (° C.) | Current Density (A/dm$^2$) | Ni Plating Treatment Time (s) |
| 1 | 330 | 70 | 45 | 73 | 4.0 | 55 | 20 | 7.9 |
| 2 | 330 | 70 | 45 | 73 | 4.0 | 55 | 20 | 10.4 |
| 3 | 330 | 70 | 45 | 73 | 4.0 | 55 | 20 | 10.3 |
| 4 | 330 | 70 | 45 | 73 | 4.0 | 55 | 20 | 10.5 |
| 5 | 330 | 70 | 45 | 73 | 4.0 | 55 | 20 | 10.3 |
| 6 | 330 | 70 | 45 | 73 | 4.0 | 55 | 20 | 10.3 |
| 7 | 330 | 70 | 45 | 73 | 4.0 | 55 | 20 | 10.2 |
| 8 | 330 | 70 | 45 | 73 | 4.0 | 55 | 20 | 2.2 |
| 9 | 330 | 70 | 45 | 73 | 4.0 | 55 | 20 | 59.5 |
| 10 | 330 | 70 | 45 | 73 | 4.0 | 55 | 20 | 10.4 |
| 11 | 330 | 70 | 45 | 73 | 4.0 | 55 | 20 | 10.2 |
| 12 | 330 | 70 | 45 | 73 | 4.0 | 55 | 20 | 10.2 |
| 13 | 330 | 70 | 45 | 73 | 4.0 | 55 | 20 | 10.2 |

[Co Plating Process]

A Co plating layer was formed on the Ni plating layer. The Co plating layer was formed on both sides of the steel sheet. The obtained Co plating layer was a plating layer consisting of Co and impurities. The Co plating conditions for each test number are shown below.

TABLE 2

| | Co Plating Bath Composition | | | | | | Co Plating Conditions | | |
| --- | --- | --- | --- | --- | --- | --- | --- | --- | --- |
| | | | | | | | Co Plating | | Co |
| Test No. | Cobalt (II) Sulfate Heptahydrate (g/L) | Boric Acid (g/L) | Formic Acid (g/L) | Sulfuric Acid (g/L) | Co Ions Concentration (g/L) | pH | Bath Temperature (° C.) | Current Density (A/dm$^2$) | Plating Treatment Time (s) |
| 1 | 250 | 45 | 25 | 1.5 | 52 | 1.5 | 55 | 20 | 3.2 |
| 2 | 250 | 45 | 25 | 1.5 | 52 | 1.5 | 55 | 20 | 3.3 |
| 3 | 250 | 45 | 25 | 1.5 | 52 | 1.5 | 55 | 20 | 3.5 |
| 4 | 250 | 45 | 25 | 1.5 | 52 | 1.5 | 55 | 20 | 3.3 |
| 5 | 250 | 45 | 25 | 1.5 | 52 | 1.5 | 55 | 20 | 3.4 |
| 6 | 250 | 45 | 25 | 1.5 | 52 | 1.5 | 55 | 20 | 3.3 |
| 7 | 250 | 45 | 25 | 1.5 | 52 | 1.5 | 55 | 20 | 3.5 |
| 8 | 250 | 45 | 25 | 1.5 | 52 | 1.5 | 55 | 20 | 3.2 |
| 9 | 250 | 45 | 25 | 1.5 | 52 | 1.5 | 55 | 20 | 3.4 |
| 10 | 250 | 45 | 25 | 1.5 | 52 | 1.5 | 55 | 20 | 4.2 |
| 11 | 250 | 45 | 25 | 1.5 | 52 | 1.5 | 55 | 20 | 1.4 |
| 12 | 250 | 45 | 25 | 1.5 | 52 | 1.5 | 55 | 20 | 3.3 |
| 13 | 250 | 45 | 25 | 1.5 | 52 | 1.5 | 55 | 20 | 3.3 |

[Alloying Heat Treatment Process]

Steel sheets having an Ni plating layer and a Co plating layer, or having an Ni plating layer were subjected to a continuous alloying heat treatment in a $N_2+2\%$ $H_2$ atmosphere. The treatment temperature, the alloying treatment time, and the average heating rate from 500° C. to the treatment temperature in the alloying heat treatment of each test number are shown in Table 3. After undergoing the alloying heat treatment, the steel sheet was cooled to 100° C. using $N_2$ gas.

[Temper Rolling Process]

Each steel sheet after the alloying heat treatment and cooling was subjected to temper rolling. The rolling reduction in the temper rolling was 1.2%. The surface-treated steel sheet of each test number was produced by the above processes.

[Test to Measure Content of Ni and Content of Co in Alloy Layer]

The content of Ni and content of Co in the alloy layer of the surface-treated steel sheet of each test number were measured by the following method. The surface-treated steel sheet of each test number was cut in the thickness direction, and a cross section that excluded edge vicinity regions having a width of 5 mm from each edge (each end) of the surface-treated steel sheet was observed using a scanning electron microscope at a magnification of ×10000, and the thickness of the alloy layer was measured. Next, a sample having a diameter of 40 mm that included the alloy layer was extracted from inside an inner region that excluded edge vicinity regions having a width of 5 mm from each edge (each end) of the surface-treated steel sheet. The alloy layer of the obtained sample was dissolved in a mixed acid of concentrated hydrochloric acid: concentrated nitric acid=1:1 at 25° C. The time of the dissolution treatment was set according to the thickness of the alloy layer measured earlier. The obtained solution was analyzed by high-frequency inductively coupled plasma (ICP) emission spectrometry (model number SPS-3500, manufactured by Hitachi High-Tech Corporation). The content of Ni (g/m$^2$) and the content of Co (g/m$^2$) in the alloy layer were determined based on the obtained results and the area of the sample. The results are shown in the columns "Ni Content (g/m$^2$)" and "Co Content (g/m$^2$)" in Table 3.

[TEM-EDX Analysis]

Figure 5:
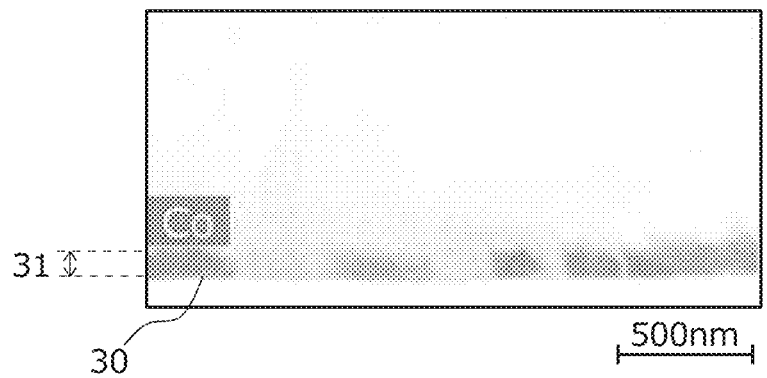
FIG. 5 is a Co element mapping image of a cross section of an alloy layer of a surface-treated steel sheet of Test Number 2.
Figure 6:
FIG. 6 is a Co element mapping image of a cross section of an alloy layer of a surface-treated steel sheet of Test Number 13.

The outer layer of the alloy layer of the surface-treated steel sheet of each test number was analyzed by aberration correction function-equipped transmission electron microscope-energy dispersive X-ray spectroscopy (Cs-TEM-EDX). First, the surface-treated steel sheet including the alloy layer was cut in the thickness direction of the alloy layer. In the face obtained by cutting the surface-treated steel sheet, an inner region which excluded edge vicinity regions having a width of 5 mm from each edge (each end) of the surface-treated steel sheet was adopted as an observation surface, and a test specimen for observation by an aberration correction function-equipped transmission electron microscope (Cs-TEM) having a thickness of about 150 nm that included the observation surface was prepared by FIB processing. The observation surface of the obtained test specimen was analyzed by aberration correction function-equipped transmission electron microscope-energy dispersive X-ray spectroscopy (Cs-TEM-EDX). The type of device used for the analysis was Titan (manufactured by Thermo Fisher Scientific Inc.). Analysis was performed by irradiation of an electron beam having a beam diameter of about 0.1 nm at a measurement magnification of 225000 times and an accelerating voltage of 200 kV, and the respective X-ray intensities of Co-kα line and Ni-kα line were measured. Element mapping images for Co and Ni were created based on the X-ray intensity of each element. In the obtained element mapping images for Co and Ni, an arbitrary range having a width of 2000 nm and extending to a depth of 100 nm from the surface of the alloy layer in the aforementioned observation surface was selected. This range was partitioned into regions each having a width of 100 nm and a depth of 100 nm in a manner so that the respective regions did not overlap. Each partitioned region was broken down into 100 cells having a width of 10 nm and a depth of 10 nm. The average Co concentration of each of the 100 cells was calculated based on the measurement results obtained by the Cs-TEM-EDX. The calculated Co concentrations of the 100 cells were added together, and the total value of the Co concentrations was divided by 100. In this way, the average Co concentration in each region was determined. The average Ni concentration in each region was determined by the same method. In this way, the Co concentration and the Ni concentration in each region were determined. Among the regions, those regions in which the ratio of the Co concentration to the sum of the Co concentration and the Ni concentration was 0.8 or more were identified. The identified regions were defined as high Co concentration regions. Further, among the partitioned regions, those regions in which the ratio of the Co concentration to the sum of the Co concentration and the Ni concentration was less than 0.8 were identified. These regions were defined as alloyed regions. The area fraction (%) of high Co concentration regions in the aforementioned range having a width of 2000 nm and extending from the surface of the alloy layer to a depth of 100 nm is shown in the column "High Co Concentration Regions (%)" in Table 3. The area fraction (%) of alloyed regions in the aforementioned range having a width of 2000 nm and extending from the surface of the alloy layer to a depth of 100 nm is shown in the column "Alloyed Regions (%)" in Table 3. Further, in a case where a plurality of high Co concentration regions and a plurality of alloyed regions were arranged alternately in the aforementioned range having a width of 2000 nm and extending from the surface of the alloy layer to a depth of 100 nm, "T" (true) is described in the column "Arranged Alternately" in Table 3. In a case where a plurality of high Co concentration regions and a plurality of alloyed regions were not arranged alternately in the aforementioned range having a width of 2000 nm and extending from the surface of the alloy layer to a depth of 100 nm, "F" (false) is described in the column "Arranged Alternately" in Table 3. In addition, the ratio of the area of high Co concentration regions to the area of alloyed regions in the aforementioned range having a width of 2000 nm and extending from the surface of the alloy layer to a depth of 100 nm was determined. The results are shown in the column "Co/Alloy Area Ratio" in Table 3. Further, the element mapping image for Co in Test Number 2 is shown in FIG. 5. The element mapping image for Co in Test Number 13 is shown in FIG. 6.

[Impedance Measurement Test]

The impedance value of the surface of the surface-treated steel sheet of each test number was measured. Specifically, the surface-treated steel sheet of each test number was held at a constant potential for 10 days at 0.3 V vs. Hg/HgO in a 35% KOH aqueous solution at 60° C. Here, 0.3 V vs. Hg/HgO is the potential of manganese dioxide in the positive electrode of a manganese battery. The impedance value at a frequency of 0.1 Hz of the surface-treated steel sheet after being held at the constant potential was measured. The measurement was performed using HZ-7000 manufactured by Hokuto Denko Co., Ltd. The results are shown in Table 3.

[Color Difference Measurement Test]

The surface-treated steel sheet of each test number was placed in a constant temperature and humidity testing machine (manufactured by Tokyo Rikakikai Co., Ltd, model number KCL-2000A), and held at a temperature of 40° C. and a humidity of 90% rh for 10 days. The $L^*a^*b^*$ values of the surface-treated steel sheet were measured before and after being held at the constant temperature and constant humidity. A spectrophotometer (manufactured by KONICA MINOLTA, INC., model number CM-2600D) was used for the measurement. The measurement conditions were as follows: sample size: 50 mm×100 mm, measurement diameter: φ6 mm, reflection, specular component treatment: SCE. A color difference ($\Delta E^*$) was determined based on the $L^*a^*b^*$ values before and after being held at the constant temperature and constant humidity. The results are shown in Table 3.

[Evaluation Results]

Referring to Table 3 and FIG. 5, the surface-treated steel sheet of each of Test Number 1 to Test Number 11 included a steel sheet and an alloy layer containing Ni and Co on the surface of the steel sheet, and the alloy layer included, in an outer layer, a plurality of high Co concentration regions, and a plurality of alloyed regions that were arranged alternately with the high Co concentration regions. As a result, in the surface-treated steel sheet of each of Test Number 1 to Test Number 11, the impedance was 50Ω or less, and the color difference ($\Delta E^*$) was 4.5 or less. In the surface-treated steel sheet of each of Test Number 1 to Test Number 11, the contact resistance was low and it was possible to suppress a change in the color of the surface.

TABLE 3

| | Alloying Heat Treatment Conditions | | | Alloy Layer | | Outer Layer of Alloy Layer | | | | Evaluation Results | |
| --- | --- | --- | --- | --- | --- | --- | --- | --- | --- | --- | --- |
| | Treatment | | | Ni | Co | High Co | Alloyed | | Co/Alloy | | |
| Test No. | Temperature (° C.) | Time (s) | Heating Rate (° C./s) | Content (g/m$^2$) | Content (g/m$^2$) | Concentration Regions (%) | Regions (%) | Arranged Alternately | Area Ratio | Impedance (Ω) | Difference ($\Delta E^*$) |
| 1 | 800 | 20 | 15 | 4.72 | 1.01 | 65 | 35 | T | 1.86 | 38 | 1.9 |
| 2 | 800 | 20 | 15 | 6.23 | 1.04 | 70 | 30 | T | 2.33 | 38 | 2.4 |
| 3 | 800 | 20 | 15 | 6.14 | 1.11 | 80 | 20 | T | 4.00 | 35 | 2.6 |
| 4 | 825 | 20 | 15 | 6.30 | 1.05 | 10 | 90 | T | 0.11 | 47 | 1.3 |
| 5 | 750 | 20 | 15 | 6.14 | 1.07 | 90 | 10 | T | 9.00 | 28 | 4.0 |
| 6 | 850 | 20 | 15 | 6.17 | 1.04 | 5 | 95 | T | 0.05 | 47 | 1.0 |
| 7 | 800 | 20 | 20 | 6.13 | 1.12 | 60 | 40 | T | 1.50 | 41 | 1.7 |
| 8 | 800 | 20 | 15 | 1.34 | 1.02 | 65 | 35 | T | 1.86 | 37 | 2.0 |
| 9 | 800 | 20 | 15 | 35.63 | 1.06 | 70 | 30 | T | 2.33 | 39 | 2.5 |
| 10 | 800 | 20 | 15 | 6.21 | 1.34 | 70 | 30 | T | 2.33 | 38 | 2.4 |
| 11 | 800 | 20 | 15 | 6.12 | 0.45 | 50 | 50 | T | 1.00 | 36 | 2.3 |
| 12 | 750 | 20 | 10 | 6.10 | 1.03 | 100 | 0 | F | — | 15 | 6.3 |
| 13 | 750 | 20 | 5 | 6.11 | 1.05 | 100 | 0 | F | — | 14 | 9.4 |

On the other hand, referring to Table 3 and FIG. 6, in the surface-treated steel sheet of each of Test Number 12 and Test Number 13, the outer layer of the alloy layer did not include therein a plurality of high Co concentration regions, and a plurality of alloyed regions arranged alternately with high Co concentration regions. As a result, in the surface-treated steel sheet of Test Number 12, the color difference (ΔE*) was 6.3, and in the surface-treated steel sheet of Test Number 13, the color difference (ΔE*) was 9.4. In the surface-treated steel sheets of Test Number 12 and Test Number 13, a change in the color of the surface could not be suppressed.

An embodiment of the present disclosure has been described above. However, the foregoing embodiment is merely an example for implementing the present disclosure. Accordingly, the present disclosure is not limited to the above embodiment, and the above embodiment can be appropriately modified within a range that does not deviate from the gist of the present invention.

REFERENCE SIGNS LIST

1 Surface-treated Steel Sheet
2 Steel Sheet
3 Alloy Layer
10 Positive electrode (Manganese Dioxide)
11 Negative electrode (Zinc)
12 Separator
13 Current Collector
14 Insulator
15 Positive electrode Terminal
20 Surface of Alloy Layer
31 Outer Layer of Alloy Layer
100 High Co Concentration Region
110 Alloyed Region

The invention claimed is:

1. A surface-treated steel sheet, comprising:
    a steel sheet, and
    an alloy layer containing Ni and Co on a surface of the steel sheet,
    wherein
    in a case where, in a cross section obtained by cutting the alloy layer in a thickness direction, a range having a width of 2000 nm and extending from a surface of the alloy layer to a depth of 100 nm is partitioned into regions each having a width of 100 nm and a depth of 100 nm, within the range the alloy layer includes:
    a plurality of high Co concentration regions in each of which a ratio of a Co concentration to a sum of the Co concentration and a Ni concentration within the partitioned region based on the measurement results obtained by aberration correction function-equipped transmission electron microscope with energy dispersive X-ray spectroscopy is 0.8 or more, and
    a plurality of alloyed regions in each of which a ratio of the Co concentration to a sum of the Co concentration and the Ni concentration within the partitioned region based on the measurement results obtained by aberration correction function-equipped transmission electron microscope with energy dispersive X-ray spectroscopy is less than 0.8, the plurality of alloyed regions being arranged alternately with the high Co concentration regions.

2. The surface-treated steel sheet according to claim 1, wherein:
    in the range which, in the cross section obtained by cutting the alloy layer in the thickness direction of the alloy layer, has a width of 2000 nm and extends to a depth of 100 nm from the surface of the alloy layer, a ratio of an area of the high Co concentration regions to an area of the alloyed regions is 0.10 to 4.00.

3. The surface-treated steel sheet according to claim 1, wherein:
    per side of the steel sheet, a content of Ni in the alloy layer is 1.34 to 5.36 g/m$^2$, and a content of Co in the alloy layer is 0.45 to 1.34 g/m$^2$.

4. The surface-treated steel sheet according to claim 1, wherein:
    per side of the steel sheet, a content of Ni in the alloy layer is 5.36 to 35.6 g/m$^2$, and a content of Co in the alloy layer is 0.45 to 1.34 g/m$^2$.

5. The surface-treated steel sheet according to claim 2, wherein:
    per side of the steel sheet, a content of Ni in the alloy layer is 1.34 to 5.36 g/m$^2$, and a content of Co in the alloy layer is 0.45 to 1.34 g/m$^2$.

6. The surface-treated steel sheet according to claim 2, wherein:
    per side of the steel sheet, a content of Ni in the alloy layer is 5.36 to 35.6 g/m$^2$, and a content of Co in the alloy layer is 0.45 to 1.34 g/m$^2$.

* * * * *